United States Patent
Govindan et al.

(10) Patent No.: US 10,142,163 B2
(45) Date of Patent: Nov. 27, 2018

(54) BFD OVER VXLAN ON VPC UPLINKS

(71) Applicant: Cisco Technology, Inc., San Jose, CA (US)

(72) Inventors: Vengada Prasad Govindan, Chennai (IN); Ayan Banerjee, Fremont, CA (US); Mehak Mahajan, Santa Clara, CA (US); Abhayraj Kuldip Gidwani, Dublin, CA (US); Mudigonda Jwala Mallik, Chennai (IN)

(73) Assignee: CISCO TECHNOLOGY, INC, San Jose, CA (US)

( * ) Notice: Subject to any disclaimer, the term of this patent is extended or adjusted under 35 U.S.C. 154(b) by 275 days.

(21) Appl. No.: 15/063,288

(22) Filed: Mar. 7, 2016

(65) Prior Publication Data
US 2017/0257260 A1    Sep. 7, 2017

(51) Int. Cl.
*H04L 1/00*  (2006.01)
*H04L 12/26* (2006.01)
(Continued)

(52) U.S. Cl.
CPC ...... *H04L 41/0654* (2013.01); *H04L 12/4633* (2013.01)

(58) Field of Classification Search
CPC ..... H04L 12/46; H04L 12/24; H04L 12/4633; H04L 41/0654
See application file for complete search history.

(56) References Cited

U.S. PATENT DOCUMENTS

| 4,298,770 A | 11/1981 | Nishihara et al. |
| 4,636,919 A | 1/1987 | Itakura et al. |
| (Continued) | | |

FOREIGN PATENT DOCUMENTS

| CN | 103297552 | 9/2013 |
| CN | 104639464 | 5/2015 |
| (Continued) | | |

OTHER PUBLICATIONS

Abdo, E., "HOST_ID TCP Options: Implementation &Preliminary Test Results," Network Working Group Internet Draft draft-abdo-hostid-tcpopt-implementation-03, Jul. 16, 2012, 30 pages; http://tools.ietf.org/pdf/draft-abdo-hostid-tcpopt-implementation-03.pdf.
(Continued)

*Primary Examiner* — Yemane Mesfin
*Assistant Examiner* — Abdelillah Elmejjarmi
(74) *Attorney, Agent, or Firm* — Polsinelli PC

(57) ABSTRACT

Disclosed are systems, methods, and computer-readable storage media for synchronizing the secondary vPC node to the primary vPC node in a BFD protocol over a VxLAN channel with a remote node. In some embodiments of the present technology a primary vPC node can receive a packet from the remote node. The primary vPC node can then determine the packet includes either a MAC address corresponding to the primary vPC node or a secondary vPC node, and at least one inner packet identifier. Additionally, the primary networking switch can identify an access control list (ACL) entry from a set of ACL entries based on the at least one inner packet identifier. Subsequently, based on the ACL entry, the primary vPC node can generate a copy of the packet. After which, the primary vPC node can transmit the packet to the secondary vPC node.

14 Claims, 9 Drawing Sheets

(51) Int. Cl.
*H04L 12/28* (2006.01)
*H04L 12/24* (2006.01)
*H04L 12/46* (2006.01)

(56) References Cited

U.S. PATENT DOCUMENTS

| | | | |
|---|---|---|---|
| 4,700,016 A | 10/1987 | Hitchcock et al. | |
| 5,859,835 A | 1/1999 | Varma et al. | |
| 5,926,458 A | 1/1999 | Yin | |
| 6,230,231 B1 | 5/2001 | Delong et al. | |
| 6,389,031 B1 | 5/2002 | Chao et al. | |
| 6,677,831 B1 | 1/2004 | Cheng et al. | |
| 6,714,553 B1 | 3/2004 | Poole et al. | |
| 6,757,897 B1 | 6/2004 | Shi et al. | |
| 6,769,033 B1 | 7/2004 | Bass et al. | |
| 6,876,952 B1 | 4/2005 | Kappler et al. | |
| 6,907,039 B2 | 6/2005 | Shen | |
| 6,941,649 B2 | 9/2005 | Goergen et al. | |
| 6,952,421 B1 | 10/2005 | Slater | |
| 6,954,463 B1 | 10/2005 | Ma et al. | |
| 6,996,099 B1 | 2/2006 | Kadambi et al. | |
| 7,068,667 B2 | 6/2006 | Foster et al. | |
| 7,152,117 B1 | 12/2006 | Stapp et al. | |
| 7,177,946 B1 | 2/2007 | Kaluve et al. | |
| 7,372,857 B1 | 5/2008 | Kappler et al. | |
| 7,379,459 B2 | 5/2008 | Ohnishi | |
| 7,411,915 B1 | 8/2008 | Spain et al. | |
| 7,426,604 B1 | 9/2008 | Rygh et al. | |
| 7,463,590 B2 | 12/2008 | Mualem et al. | |
| 7,630,368 B2 | 12/2009 | Tripathi et al. | |
| 7,729,296 B1 | 6/2010 | Choudhary et al. | |
| 7,742,406 B1 | 6/2010 | Muppala | |
| 7,826,469 B1 | 11/2010 | Li et al. | |
| 7,852,748 B2 | 12/2010 | Le Faucheur et al. | |
| 7,940,763 B1 | 5/2011 | Kastenholz | |
| 8,170,025 B2 | 5/2012 | Kloth et al. | |
| 8,190,843 B1 | 5/2012 | De Forest et al. | |
| 8,195,736 B2 | 6/2012 | Malloy et al. | |
| 8,302,301 B2 | 11/2012 | Lau | |
| 8,325,459 B2 | 12/2012 | Mutnury et al. | |
| 8,339,973 B1 | 12/2012 | Pichumani et al. | |
| 8,369,335 B2 | 2/2013 | Jha et al. | |
| 8,411,688 B2 | 4/2013 | Farkas et al. | |
| 8,509,087 B2 | 8/2013 | Rajagopalan et al. | |
| 8,687,629 B1 | 4/2014 | Kompella et al. | |
| 8,868,766 B1 | 10/2014 | Theimer et al. | |
| 8,874,876 B2 | 10/2014 | Bhadra et al. | |
| 8,995,272 B2 | 3/2015 | Agarwal et al. | |
| 9,053,070 B1 | 6/2015 | Arguelles | |
| 9,197,553 B2 | 11/2015 | Jain et al. | |
| 9,203,188 B1 | 12/2015 | Siechen et al. | |
| 9,258,195 B1 | 2/2016 | Pendleton et al. | |
| 9,274,710 B1 | 3/2016 | Oikarinen et al. | |
| 9,374,294 B1 | 6/2016 | Pani | |
| 9,402,470 B2 | 8/2016 | Shen et al. | |
| 9,407,501 B2 | 8/2016 | Yadav et al. | |
| 9,433,081 B1 | 8/2016 | Xiong et al. | |
| 9,444,634 B2 | 9/2016 | Pani et al. | |
| 9,502,111 B2 | 11/2016 | Dharmapurikar et al. | |
| 9,509,092 B2 | 11/2016 | Shen et al. | |
| 9,590,914 B2 | 3/2017 | Alizadeh Attar et al. | |
| 9,602,424 B1 | 3/2017 | Vincent et al. | |
| 9,627,063 B2 | 4/2017 | Dharmapurikar et al. | |
| 9,634,846 B2 | 4/2017 | Pani | |
| 9,635,937 B2 | 5/2017 | Shen et al. | |
| 9,654,300 B2 | 5/2017 | Pani | |
| 9,654,385 B2 | 5/2017 | Chu et al. | |
| 9,654,409 B2 | 5/2017 | Yadav et al. | |
| 9,655,232 B2 | 5/2017 | Saxena et al. | |
| 9,667,431 B2 | 5/2017 | Pani | |
| 9,667,551 B2 | 5/2017 | Edsall et al. | |
| 9,669,459 B2 | 6/2017 | Guthrie et al. | |
| 9,674,086 B2 | 6/2017 | Ma et al. | |
| 9,686,180 B2 | 6/2017 | Chu et al. | |
| 9,698,994 B2 | 7/2017 | Pani | |
| 9,710,407 B2 | 7/2017 | Oikarinen et al. | |
| 9,716,665 B2 | 7/2017 | Alizadeh Attar et al. | |
| 9,729,387 B2 | 8/2017 | Agarwal et al. | |
| 9,742,673 B2 | 8/2017 | Banerjee et al. | |
| 9,755,965 B1 | 9/2017 | Yadav et al. | |
| 9,544,224 B2 | 10/2017 | Chu et al. | |
| 9,806,995 B2 | 10/2017 | Chu et al. | |
| 9,825,857 B2 | 11/2017 | Banerjee et al. | |
| 9,832,122 B2 | 11/2017 | Dharmapurikar et al. | |
| 9,876,711 B2 | 1/2018 | Chu et al. | |
| 2002/0126671 A1 | 9/2002 | Ellis et al. | |
| 2002/0146026 A1 | 10/2002 | Unitt et al. | |
| 2003/0035385 A1 | 2/2003 | Walsh et al. | |
| 2003/0067924 A1 | 4/2003 | Choe et al. | |
| 2003/0097461 A1 | 5/2003 | Barham et al. | |
| 2003/0115319 A1 | 6/2003 | Dawson et al. | |
| 2003/0123462 A1 | 7/2003 | Kusayanagi | |
| 2003/0137940 A1 | 7/2003 | Schwartz et al. | |
| 2003/0174650 A1 | 9/2003 | Shankar et al. | |
| 2003/0231646 A1 | 12/2003 | Chandra et al. | |
| 2004/0062259 A1 | 4/2004 | Jeffries et al. | |
| 2004/0073715 A1 | 4/2004 | Folkes et al. | |
| 2004/0100901 A1 | 5/2004 | Bellows | |
| 2004/0103310 A1 | 5/2004 | Sobel et al. | |
| 2004/0160956 A1 | 8/2004 | Hardy et al. | |
| 2004/0249960 A1 | 12/2004 | Hardy et al. | |
| 2005/0007961 A1 | 1/2005 | Scott et al. | |
| 2005/0013280 A1 | 1/2005 | Buddhikot et al. | |
| 2005/0083933 A1 | 4/2005 | Fine et al. | |
| 2005/0144290 A1 | 6/2005 | Mallal et al. | |
| 2005/0175020 A1 | 8/2005 | Park et al. | |
| 2005/0207410 A1 | 9/2005 | Adhikari et al. | |
| 2006/0028285 A1 | 2/2006 | Jang et al. | |
| 2006/0031643 A1 | 2/2006 | Figueira | |
| 2006/0183488 A1 | 8/2006 | Billhartz | |
| 2006/0198315 A1 | 9/2006 | Sasagawa et al. | |
| 2006/0209688 A1 | 9/2006 | Tsuge et al. | |
| 2006/0221835 A1 | 10/2006 | Sweeney et al. | |
| 2006/0250982 A1 | 11/2006 | Yuan et al. | |
| 2006/0268742 A1 | 11/2006 | Chu et al. | |
| 2006/0280179 A1 | 12/2006 | Meier | |
| 2007/0025241 A1 | 2/2007 | Nadeau et al. | |
| 2007/0104198 A1 | 5/2007 | Kalluri et al. | |
| 2007/0133566 A1 | 6/2007 | Copps | |
| 2007/0223372 A1 | 9/2007 | Haalen et al. | |
| 2007/0274229 A1 | 11/2007 | Scholl et al. | |
| 2007/0280264 A1 | 12/2007 | Milton et al. | |
| 2008/0031130 A1 | 2/2008 | Raj et al. | |
| 2008/0031247 A1 | 2/2008 | Tahara et al. | |
| 2008/0092213 A1 | 4/2008 | Wei et al. | |
| 2008/0147830 A1 | 6/2008 | Ridgill et al. | |
| 2008/0151863 A1 | 6/2008 | Lawrence et al. | |
| 2008/0177896 A1 | 7/2008 | Quinn et al. | |
| 2008/0225853 A1 | 9/2008 | Melman et al. | |
| 2008/0243495 A1 | 10/2008 | Anandakumar et al. | |
| 2008/0253366 A1* | 10/2008 | Zuk | H04L 45/04 370/389 |
| 2008/0298360 A1 | 12/2008 | Wijnands et al. | |
| 2008/0310421 A1 | 12/2008 | Teisberg et al. | |
| 2009/0010153 A1* | 1/2009 | Filsfils | H04L 45/02 370/218 |
| 2009/0044005 A1 | 2/2009 | Komura et al. | |
| 2009/0086629 A1 | 4/2009 | Zhang et al. | |
| 2009/0094357 A1 | 4/2009 | Keohane et al. | |
| 2009/0122805 A1 | 5/2009 | Epps et al. | |
| 2009/0188711 A1 | 7/2009 | Ahmad | |
| 2009/0193103 A1 | 7/2009 | Small et al. | |
| 2009/0232011 A1 | 9/2009 | Li et al. | |
| 2009/0238179 A1 | 9/2009 | Samprathi | |
| 2009/0268614 A1 | 10/2009 | Tay et al. | |
| 2010/0128619 A1 | 5/2010 | Shigei | |
| 2010/0150155 A1 | 6/2010 | Napierala | |
| 2010/0191813 A1 | 7/2010 | Gandhewar et al. | |
| 2010/0191839 A1 | 7/2010 | Gandhewar et al. | |
| 2010/0223655 A1 | 9/2010 | Zheng | |
| 2010/0265849 A1 | 10/2010 | Harel | |
| 2010/0281155 A1 | 11/2010 | Cipollone et al. | |
| 2010/0287227 A1 | 11/2010 | Goel et al. | |
| 2010/0290472 A1 | 11/2010 | Raman et al. | |

(56) References Cited

U.S. PATENT DOCUMENTS

| | | |
|---|---|---|
| 2010/0299553 A1 | 11/2010 | Cen |
| 2010/0312875 A1 | 12/2010 | Wilerson et al. |
| 2011/0007638 A1 | 1/2011 | Xu et al. |
| 2011/0110241 A1 | 5/2011 | Atkinson et al. |
| 2011/0138310 A1 | 6/2011 | Gomez et al. |
| 2011/0153722 A1 | 6/2011 | Choudhary et al. |
| 2011/0158248 A1 | 6/2011 | Vorunganti et al. |
| 2011/0170426 A1 | 7/2011 | Kompella et al. |
| 2011/0185073 A1 | 7/2011 | Jagadeeswaran et al. |
| 2011/0203834 A1 | 8/2011 | Yoneya et al. |
| 2011/0211578 A1 | 9/2011 | Zwiebel et al. |
| 2011/0213894 A1 | 9/2011 | Silberstein et al. |
| 2011/0228795 A1 | 9/2011 | Agrawal et al. |
| 2011/0249682 A1 | 10/2011 | Kean et al. |
| 2011/0268118 A1 | 11/2011 | Schlansker et al. |
| 2011/0273990 A1 | 11/2011 | Rajagopalan et al. |
| 2011/0274053 A1 | 11/2011 | Baik et al. |
| 2011/0286324 A1 | 11/2011 | Bellagamba et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0057452 A1* | 3/2012 | Gunukula ............... H04J 3/14 370/218 |
| 2012/0063318 A1 | 3/2012 | Boddu et al. |
| 2012/0102114 A1 | 4/2012 | Dunn et al. |
| 2012/0163164 A1 | 6/2012 | Terry et al. |
| 2012/0163396 A1 | 6/2012 | Cheng et al. |
| 2012/0246307 A1 | 9/2012 | Malloy et al. |
| 2012/0275304 A1 | 11/2012 | Patel et al. |
| 2012/0300787 A1 | 11/2012 | Korger |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0100810 A1 | 4/2013 | Slothouber |
| 2013/0107889 A1 | 5/2013 | Barabash et al. |
| 2013/0121172 A1 | 5/2013 | Cheng et al. |
| 2013/0124708 A1 | 5/2013 | Lee et al. |
| 2013/0155846 A1 | 6/2013 | Ramachandran et al. |
| 2013/0182712 A1 | 7/2013 | Aguayo et al. |
| 2013/0250951 A1 | 9/2013 | Koganti et al. |
| 2013/0311637 A1 | 11/2013 | Kamath et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0016501 A1 | 1/2014 | Kamath et al. |
| 2014/0047264 A1 | 2/2014 | Wang et al. |
| 2014/0056298 A1 | 2/2014 | Vobbilisetty et al. |
| 2014/0064278 A1 | 3/2014 | Santos et al. |
| 2014/0068750 A1 | 3/2014 | Tjahjono et al. |
| 2014/0086253 A1 | 3/2014 | Yong |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0146817 A1 | 5/2014 | Zhang |
| 2014/0146824 A1 | 5/2014 | Angst et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0258465 A1 | 9/2014 | Li |
| 2014/0269705 A1 | 9/2014 | Decusatis et al. |
| 2014/0269710 A1 | 9/2014 | Sundaram et al. |
| 2014/0269712 A1 | 9/2014 | Kidambi et al. |
| 2014/0294005 A1 | 10/2014 | Jain et al. |
| 2014/0307744 A1 | 10/2014 | Dunbar et al. |
| 2014/0321277 A1 | 10/2014 | Lynn, Jr. et al. |
| 2014/0334295 A1 | 11/2014 | Guichard et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0058470 A1 | 2/2015 | Duda |
| 2015/0073920 A1 | 3/2015 | Pashkevich et al. |
| 2015/0082418 A1 | 3/2015 | Gu |
| 2015/0092551 A1 | 4/2015 | Moisand et al. |
| 2015/0092593 A1 | 4/2015 | Kompella et al. |
| 2015/0103679 A1 | 4/2015 | Tessmer et al. |
| 2015/0113143 A1 | 4/2015 | Stuart et al. |
| 2015/0124629 A1 | 5/2015 | Pani et al. |
| 2015/0124644 A1 | 5/2015 | Pani |
| 2015/0124806 A1 | 5/2015 | Banerjee et al. |
| 2015/0124823 A1 | 5/2015 | Pani et al. |
| 2015/0124824 A1 | 5/2015 | Edsall et al. |
| 2015/0124833 A1 | 5/2015 | Ma et al. |
| 2015/0146724 A1* | 5/2015 | Leung ............... H04L 45/745 370/392 |
| 2015/0188769 A1 | 7/2015 | Gu |
| 2015/0222516 A1 | 8/2015 | Deval et al. |
| 2015/0236900 A1 | 8/2015 | Chung et al. |
| 2015/0271104 A1 | 9/2015 | Chikkamath et al. |
| 2015/0280959 A1 | 10/2015 | Vincent |
| 2015/0378712 A1 | 12/2015 | Cameron et al. |
| 2015/0378969 A1 | 12/2015 | Powell et al. |
| 2016/0080350 A1 | 3/2016 | Chaturvedi et al. |
| 2016/0119204 A1 | 4/2016 | Murasato et al. |
| 2016/0134563 A1* | 5/2016 | Yu ............... H04L 12/4625 370/390 |
| 2016/0149751 A1 | 5/2016 | Pani et al. |
| 2016/0315811 A1 | 10/2016 | Yadav et al. |
| 2017/0104636 A1 | 4/2017 | Vora et al. |
| 2017/0207961 A1 | 7/2017 | Saxena et al. |
| 2017/0214619 A1 | 7/2017 | Chu et al. |
| 2017/0237651 A1 | 8/2017 | Pani |
| 2017/0237678 A1 | 8/2017 | Ma et al. |
| 2017/0250912 A1 | 8/2017 | Chu et al. |
| 2017/0257260 A1* | 9/2017 | Govindan ........... H04L 12/4633 |
| 2017/0288948 A1 | 10/2017 | Singh et al. |

FOREIGN PATENT DOCUMENTS

| | | |
|---|---|---|
| EP | 2621136 | 7/2013 |
| WO | WO 2014/071996 | 5/2014 |

OTHER PUBLICATIONS

Boucadair, M., et al., "Analysis of Solution Candidates to Reveal a Host Identifier (HOST ID) in Shared Address Deployments," IETF INTAREA WG Internet-Draft draft-ietf-intarea-nat-reveal-analysis-05, Feb. 14, 2013, 22 pages.

Brocade Communications Systems, Inc., "Multi-Chassis Trunking for Resilient and High-Performance Network Architectures," White Paper, vvww_brocade.com, 2010, 8 pages.

Cisco Systems, Inc. "Intermediate System-to-Intermediate System (IS-IS) TLVs, Document ID 5739," updated Aug. 10, 2005, 7 pages.

Cisco Systems, Inc., "Chapter 2: Virtual Port Channel Operations," Cisco Nexus 5000 Series NX-OS Operations Guide, Release 5.0(3)N2(1), Jun. 11, 2012, 18 pages.

Cisco Systems, Inc., "Cisco Nexus 1000V VXLAN Configuration Guide, Release 4.2(1)SV2(2.1), Chapter 1, Information About VXLANs," Jun. 21, 2013, 6 pages.

Cisco Systems, Inc., "Design and Configuration Guide: Best Practices for Virtual Port Channels (vPC) on Cisco Nexus 7000 Series Switches," Revised Aug. 2014, 116 pages.

Cisco, "Cisco Fabric Path for Cisco Nexus 7000 Series Switches," White Paper, Sep. 7, 2011, 44 pages.

Cisco, "Cisco Fabric Path," At-A-Glance, 2010, 2 pages.

Cisco, "Cisco FabricPath Design Guide: Using Fabric Path with an Aggregation and Access Topology," Dec. 2011, 53 pages.

Eastlake, D., et al., "Routing Bridges (RBridges): Adjacency," IETF, RFC 6327, Jul. 2011, 27 pages.

Eastlake, D., et al., "Transparent Interconnection of Lots of Links (TRILL) Use of IS-IS," IETF, RFC 6326, Jul. 2011, 26 pages.

Eastlake, Donald, et al., " RBridges: TRILL Header Options," <draft-ietf-trill-rbridge-options-00.txt>, TRILL Working Group, Internet-Draft, Dec. 24, 2009, 18 pages.

(56) References Cited

OTHER PUBLICATIONS

Eastlake, Eastlake, et al., "RBridges: Further TRILL Header Options," <draft-ietf-trill-rbrige-options-06.txt>, TRILL Working Group, Internet Draft, Dec. 1, 2011, 20 pages.

Leiserson, Charles E., "Fat-Trees: Universal Networks for Hardware-Efficient Supercomputing," IEEE Transactions on Computers, vol. c-34, No. 10, Oct. 1985, 10 pages.

Onisick, Joe, "VXLAN Deep Dive," Genesis Framework, Wordpress, Nov. 6, 2012, 8 pages.

Perlman, R., et al., "Routing Bridges (RBridges): Base Protocol Specification," IETF, RFC 6325, Jul. 2011, 100 pages.

Perlman, Radia, et al., "Introduction to TRILL," The Internet Protocol Journal, vol. 14, No. 3, Sep. 2011, 19 pages.

Schaumann, Jan, "L3DSR—Overcoming Layer 2 Limitations of Direct Server Return Load Balancing," NANOG 51, Miami, Jan. 30, 2011, 33 pages.

Spijker, Rick Van't, "Dissertation Module for Master of Science—Mobile and Distributed Computer Networks," Leeds Metropolitan University, May 31, 2010, pp. 1-78.

Touch, J., et al., "Transparent Interconnection of Lots of Links (TRILL): Problem and Applicability Statement," Network Working Group, RFC 5556, May 2009, 18 pages.

VMware, Inc., "VMware Network Virtualization Design Guide, Technical White Paper," Jan. 2013, 25 pages.

Wikipedia®, "X-Forwarded-For," retrieved and printed from Internet Mar. 9, 2018, 4 pages; http://en.wikipedia.org/w/index.php?title=Forwarded-For&oldid=542207414.

Yourtchenko, D., et al., "Revealing hosts sharing an IP address using TCP option," Network Working Group Internet Draft draft-wing-nat-reveal-option-03.txt, Dec. 8, 2011, 10 pages.

\* cited by examiner

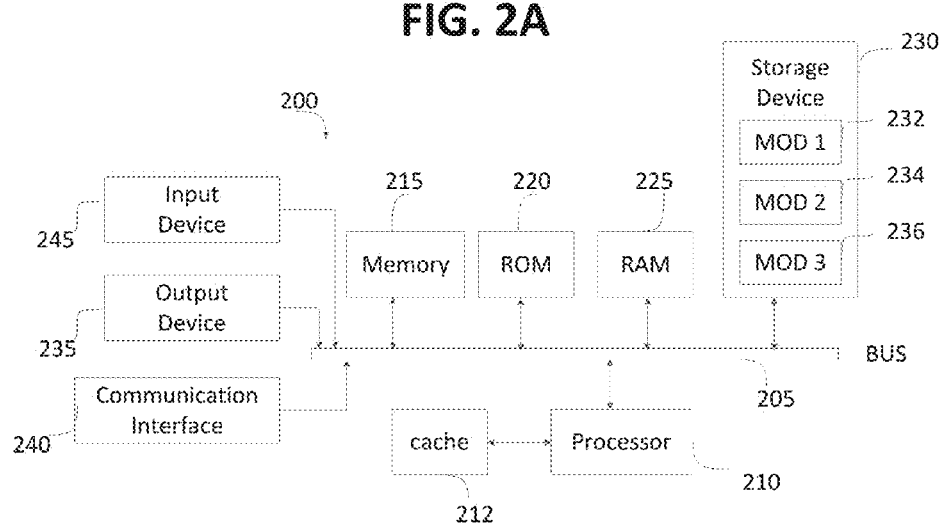
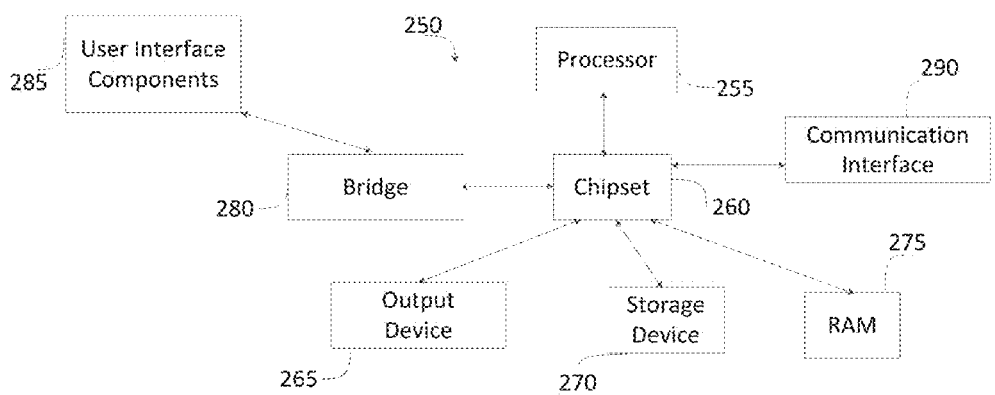

BFD OVER VXLAN ON VPC UPLINKS

TECHNICAL FIELD

The present technology pertains to failover detection protocols between two endpoints. More specifically, the present technology pertains to maintaining a hot standby BFD session on the secondary node of the vPC without using any out-of-band state synchronization mechanisms.

BACKGROUND

Bidirectional forwarding detection protocols can provide failover detection between two endpoints. Generally, bidirectional forwarding detection (BFD) protocols or sessions can provide fast forwarding path failure detection times for all media types, encapsulations, topologies and routing protocols. Furthermore BFD sessions are time sensitive failover detection. Failover detecting can depend on the intervals, scale and timers of the BFD session.

BFD sessions can be established over virtual extensible local area network (VxLAN) tunnels between two endpoints. In some instances, the BFD session is established over VxLAN tunnels between remote virtual tunnel endpoints (VTEPS) and dual-homed VTEP with multiple vPCs. In some circumstances, network operators can configure the vPCs of the dual-homed VTEP to be redundancies. However complex issues can arise under such configurations. For example when a failover occurs with the primary vPC, a failover maybe prematurely detected while the BFD session switches over to the secondary vPC.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which:

FIGS. 2A and 2B illustrate an example system embodiments according to some aspects of the subject technology;

DESCRIPTION OF EXAMPLE EMBODIMENTS

Figure 1:
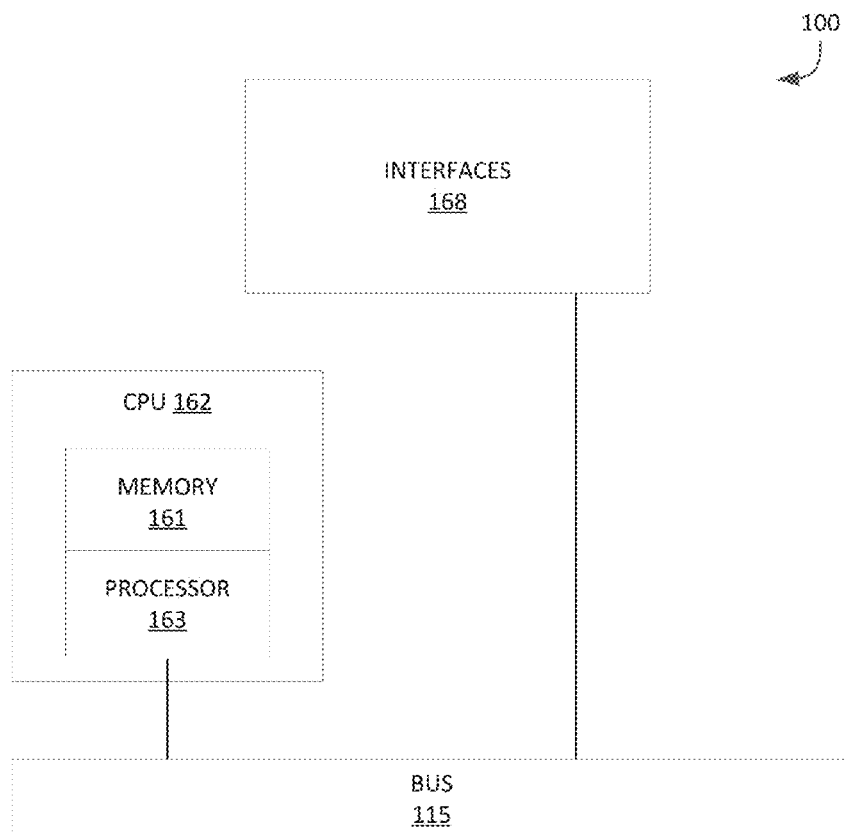
FIG. 1 illustrates an example network device according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

Disclosed are systems, methods, and computer readable storage media for synchronizing a secondary virtual port channel (vPC) node to a bidirectional forwarding detection (BFD) session between the primary vPC node and a remote node. In some embodiments of the present technology the primary or the secondary node of the vPC can receive a packet from a remote VTEP. The receiving vPC node (e.g. the primary vPC node) can then determine the packet includes a media access control (MAC) address corresponding to the primary vPC node or a secondary vPC node, and at least one inner packet identifier. Subsequently, the receiving vPC node (e.g. the primary vPC node) can identify an access control list (ACL) entry from a set of ACL entries based on the inner UDP destination address. The ACL entry can include an instruction to generate a copy the packet. After the receiving vPC node (e.g. the primary vPC node) generates a copy of the packet, the receiving vPC node can transmit the packet to the other vPC node (e.g. the secondary vPC node).

DETAILED DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
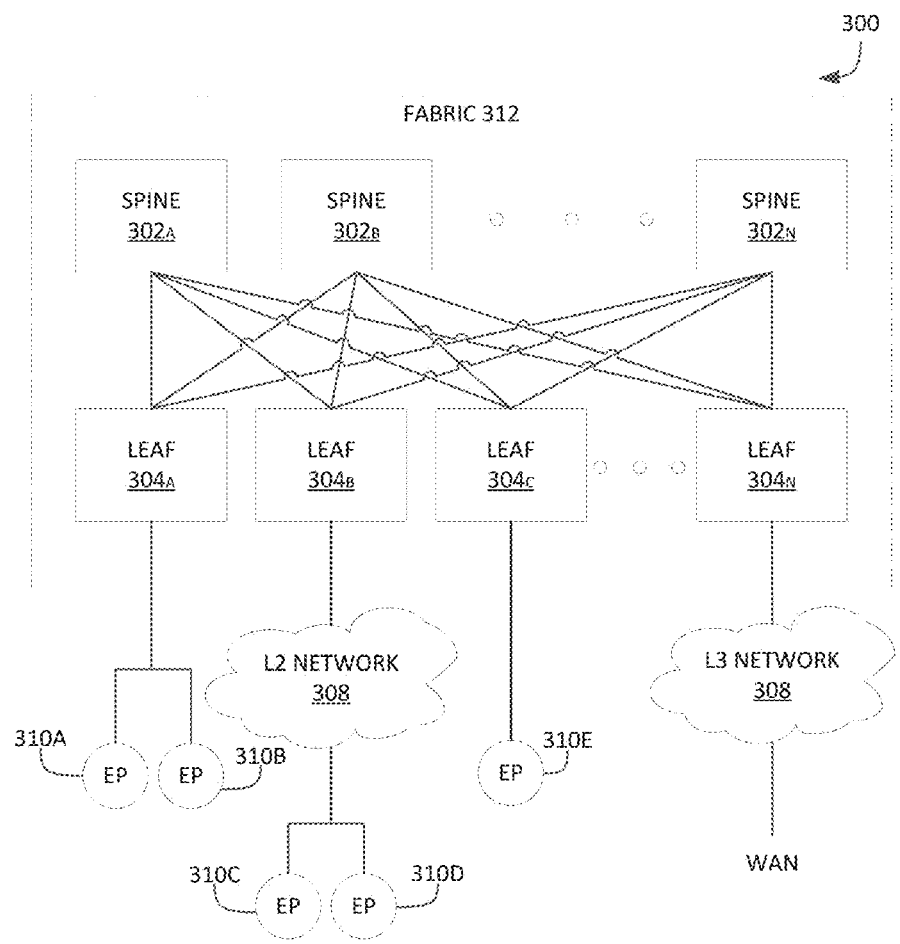
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, . . . , $302_N$ (collectively "302") connected to leaf switches $304_A$, $304_B$, $304_C$ . . . $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
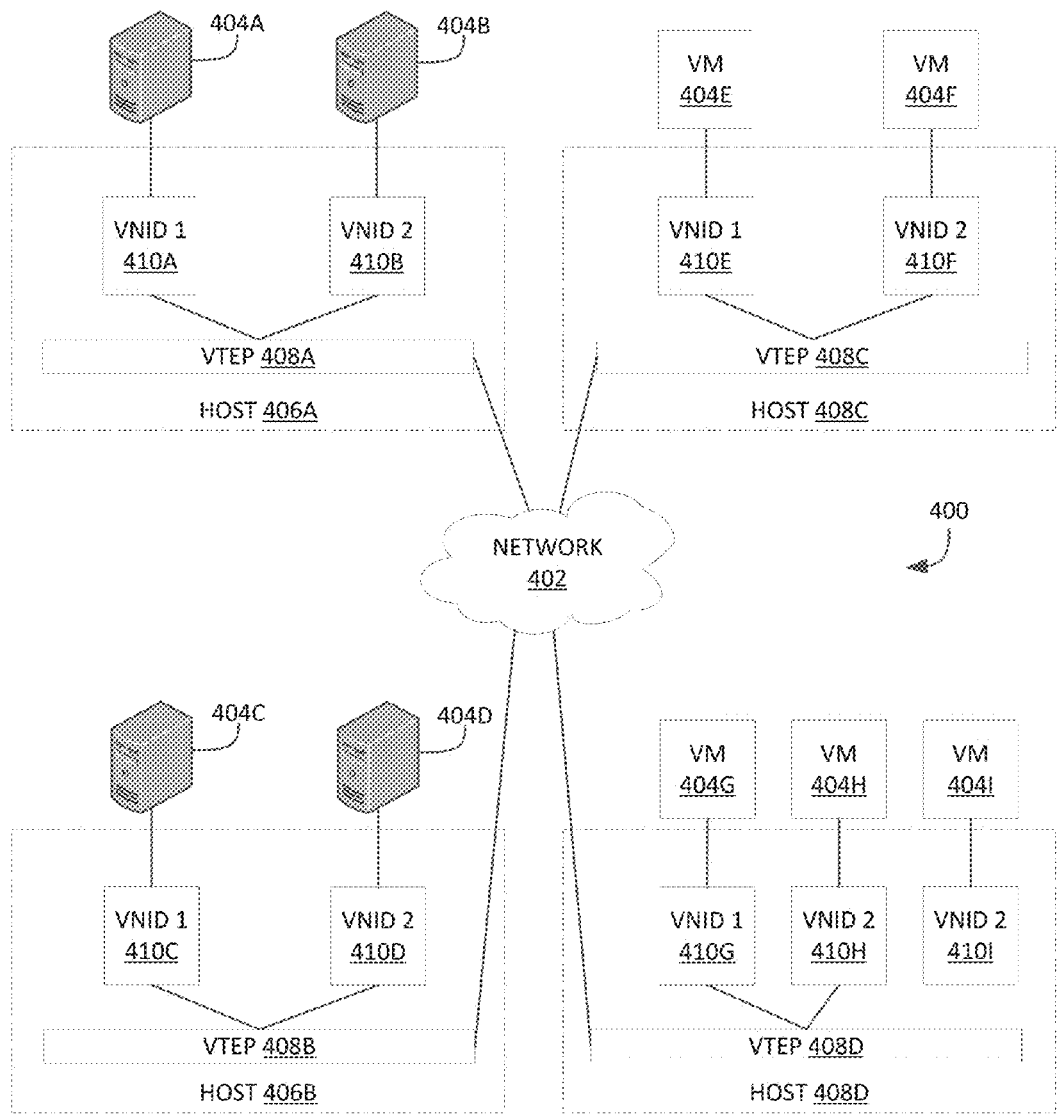
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Depending on the desired implementation in the network 400, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the network 400 illustrated in FIG. 4 is used for purposes of explanation, a network system may be implemented with many variations, as appropriate, in the configuration of network platform in accordance with various embodiments of the present disclosure.

Figure 5:
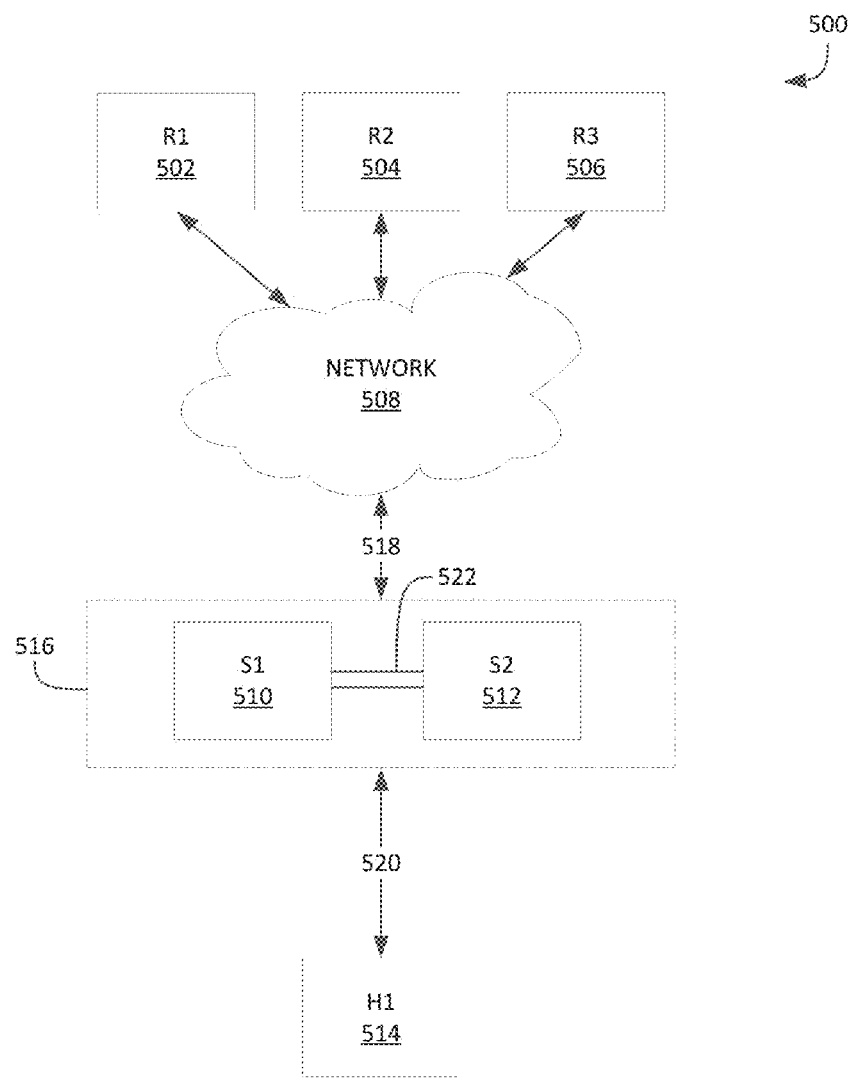
FIG. 5 illustrates example system 500 which has a BFD session established between a vPC node and a remote VTEP.

FIG. 5 illustrates example system 500 which has a BFD session established between a vPC node (e.g. 516) and a remote VTEP (e.g., 502, 504 or 506). As illustrated, example system 500 includes remote VTEP 502, remote VTEP 504, remote VTEP 506, network 508, dual-homed VTEP 516, host 514 and interlink 522. For the sake of simplicity, the disclosure will focus primarily on a BFD session running between one remote VTEP (e.g. 502) and one dual-homed VTEP (e.g. 516). It would be appreciated by those skilled in the art that the following disclosure can be applied to a system with multiple remote VTEPs, networks, dual-homed VTEPs with interlinks and hosts.

Remote VTEPs 502, 504 and 506 can be configured to operatively communicate to a server, switch, virtual machine (VM), hypervisor, etc. Host 514 can include a server, switch, virtual machine (VM), hypervisor, etc. Dual-homed VTEP 516 can include multiple vPC nodes. For instance as illustrated by FIG. 5, dual-homed VTEP 516 includes network switch 510 and network switch 512. Remote VTEPs 502, 504 and 506 and host 515 can view dual-homed VTEP 516 as one logical entity even though dual-homed VTEP 516 includes multiple vPCs (i.e., switch 510 and switch 512). As such, in system 500 with multiple remote VTEPs 502, 504 and 506 connected to dual homed VTEP 516, multiple pathways can exist between remote VTEPs 502, 504 and 506 and dual homed VTEP (e.g. 516).

Since remote VTEPs 502, 504 and 506 views dual-homed VTEP 516 as one logical entity, the remote VTEPs 502, 504 and 506 can establish a BFD session with one of the vPC nodes of dual-homed VTEP 516. The other vPC node of dual-homed VTEP 516 will function as a secondary vPC node and will host the hot standby BFD session. The vPC nodes of the dual-homed VTEP can be configured to automatically deflect or forward any received packets to the other vPC nodes of the dual-homed VTEP.

Figure 5A:
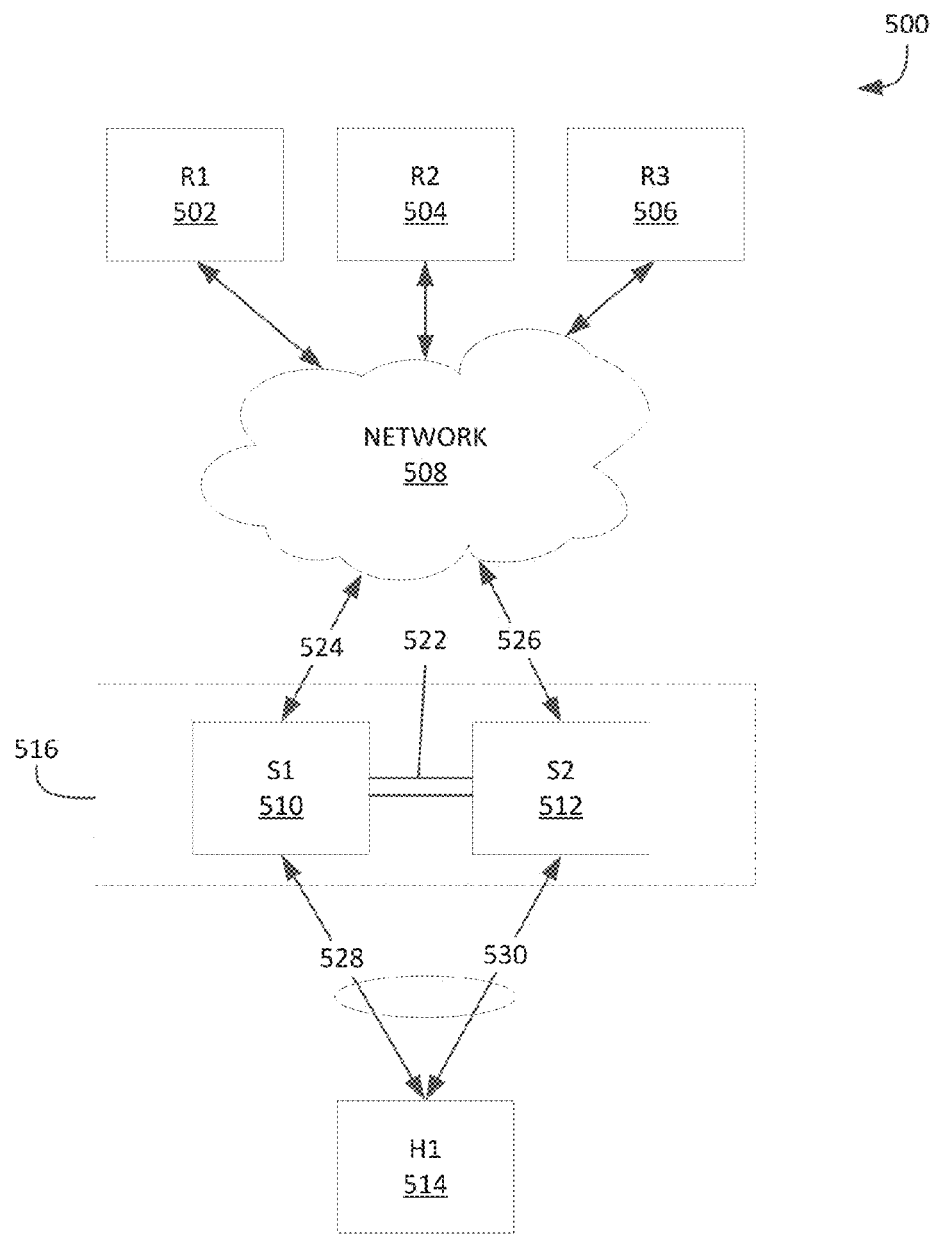
FIG. 5A illustrates the pathways of the example system 500 with a secondary vPC configured to synchronize to a BFD session between the primary vPC and a node.

For example, as illustrated in FIG. 5A, remote VTEP 502 can establish a BFD session with dual homed VTEP 516. Since remote VTEP 502 views dual-homed VTEP 516 as one logical entity, remote VTEP 502 can establish a BFD session with either network switch 510 or network switch 512. The BFD session is established between remote VTEP 502 and dual homed VTEP 516 using the virtual internet protocol (IP) address representing the VTEP 516 (the logical entity including network switch 510 and 512. There is logic to have the BFD session hosted in the node or network switch that is the current primary of the dual homed VTEP. As such in some embodiments, VTEP 502 can establish a BFD session with dual-homed VTEP 516 where network switch 510 is the primary vPC and network switch 512 is the secondary vPC. In other embodiments, VTEP 502 can establish a BFD session with dual-homed VTEP 516 where network switch 512 is the primary vPC and network switch 510 is the secondary vPC.

The non-primary vPC node can be configured as a redundancy of the primary vPC node by synchronizing to the BFD session between the primary vPC node and the remote VTEP. The secondary vPC node can periodically synchronize with the primary vPC node. However, with periodic synchronization, if the failover occurs with the primary vPC node, the secondary vPC node may have to determine whether its last synchronization is up-to-date. If the secondary vPC node determines that the synchronization with the primary vPC node is out-of-date, the secondary vPC node must synchronize with the primary vPC node before the BFD session is switched over to the secondary vPC node This last minute synchronization can cause timing delays and, consequently, prematurely trigger failover detection. The risk of triggering failover detection can be exacerbated if the BFD session is running at aggressive intervals, at a high scale (e.g. 100's of sessions) and/or aggressive timers.

To minimize the risk of triggering a premature BFD failover, the secondary vPC node can be in sync with the primary vPC node in real-time throughout the BFD session. For instance, the primary vPC node and secondary vPC node can both be configured to include the MAC addresses of the primary and secondary vPC nodes and be instructed to generate a copy of the received BFD packet. As such, regardless of which vPC node the BFD packet lands on, the BFD packet can be copied by vPC node that receives the BFD packet before transmitting the BFD packet to the other vPC node. That way, both the primary and secondary vPC nodes always have a copy of the BFD packet and the secondary vPC node will dynamically be in sync with primary vPC node. For example, as illustrated in FIG. 5, if a BFD packet from remote VTEP 502 is received by network switch 510, network switch 510 can generate a copy of the BFD packet and then send the original BFD packet to network switch 512. As such both network switch 510 and network switch 512 will have a copy of the BFD packet and will be synchronized to the BFD session. This approach is specifically taken to avoid out-of-band BFD state synchronization mechanisms.

In some embodiments, access control entries can be used to instruct the primary vPC node to generate a copy of the received BFD from the remote VTEP, prior to deflecting the BFD packet to the secondary vPC node. For example, as illustrated in FIG. 5, upon receiving a BFD packet from remote VTEP 502, network switch 510 can identify a corresponding ACL entry from a set of ACL entries based on identifiers of the BFD packet. The identified ACL entries can instruct network switch 510 to generate a copy of the BFD packet prior to network switch 510 transmitting the received BFD packet to network switch 512.

In some embodiments, in order for the redundant or secondary vPC node to synchronize to the BFD session between the primary vPC node and the remote VTEP, the secondary vPC node must also determine the BFD discriminator or identifier of the BFD session. At the secondary vPC node the local and remote discriminators of the BFD session are learnt dynamically from the BFD packets received. The learnt discriminators are associated with the corresponding BFD session objects using the IP addresses and interface index tuple. As a redundancy, the secondary vPC node can be configured to replace the primary vPC node if failover occurs with the primary vPC node.

Only the primary or initiating vPC node of the dual homed VTEP can allocate BFD discriminators. The secondary vPC node will maintain hot standby BFD sessions in passive mode and learn the corresponding BFD discriminators from the received BFD packets. The secondary vPC node will not transmit any BFD packets. For example, as illustrated by FIG. 5, network switch 510 can send a BFD session response/request to remote VTEP 502 that includes a BFD discriminator. In some instances, network switch 510 sends a response to remote VTEP 502 in response to a BFD session request from VTEP 502. Additionally, when transmitting the BFD session response/request with the BFD discriminator to remote VTEP 502, network switch 510 can also automatically generate and transmit a copy of the BFD session response/request with the BFD discriminator to network switch 512.

Figure 6:
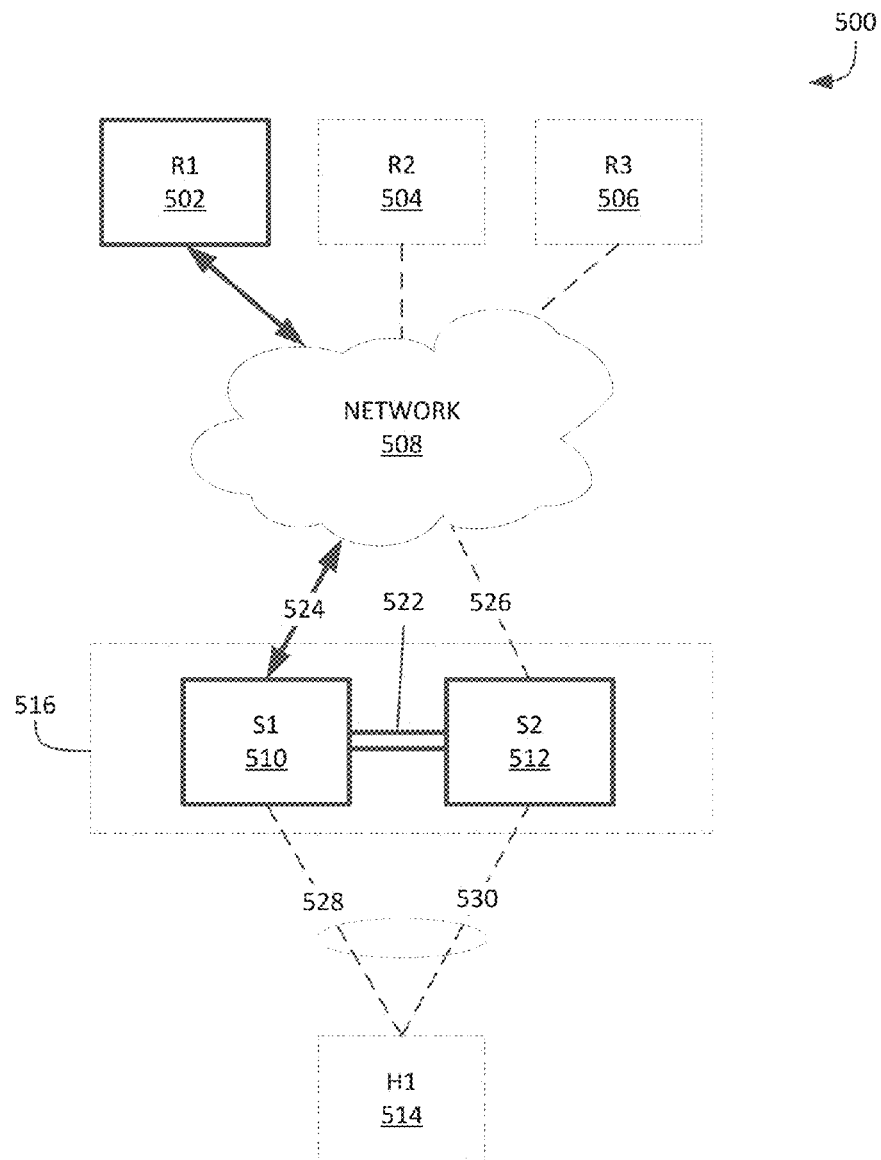
FIG. 6 illustrates an example synchronization pathway of a BFD packet in example system 500.

Reference is now made to FIG. 6. FIG. 6 illustrates an example synchronization pathway of a BFD packet in example system 500. As illustrated, and using the above-described principles, the example pathway of the BFD packet travels from remote VTEP 502, via network 508 to network switch 510 of dual-homed VTEP 516. Additionally network switches 510 and 512 include at least the MAC address entries of both network switches 510 and 512 in their respective MAC address tables.

In some embodiments, remote VTEP 502 establishes a BFD session with network switch 510. As such network switch 510 is the primary vPC node and network switch 512 is the secondary vPC node. Therefore, as illustrated in FIG. 6, when primary network switch 510 receives the BFD packet, primary network switch 510 processes the BFD packet.

While processing the BFD packet, the primary network switch 510 determines whether the BFD packet includes the MAC addresses of primary network switch 510 or secondary network switch 512. In some embodiments, if primary network switch 510 determines that the BFD packet does not include the MAC addresses of primary network switch 510 and secondary network switch 512, the BFD packet is restricted from further processing by primary network switch 512 (e.g. restricting generating a copy of the BFD packet and deflection of the BFD packet to the secondary vPC node). Additionally, in other embodiments, primary network switch 510 can generate a notification to the network operator to notify the network operator that such a BFD packet may be a malicious attack.

Upon determining the BFD packet includes the MAC addresses of either primary or secondary network switches 510 and 512, primary network switch 510 determines whether there is a corresponding matching ACL entry. The ACL entry can include instructions for the receiving vPC node to generate a copy of the received BFD packet. In some embodiments each vPC node of the dual-homed VTEP can store ACL(s). In other embodiments each vPC node of the dual-homed VTEP can request and receive ACL(s) from a separate database.

In some embodiments, after determining whether the BFD packet includes at least the MAC addresses of either primary vPC node or secondary vPC node, the outer VxLAN packet header may be removed by the receiving vPC node. As such the ACL entry can include at least one inner BFD packet identifier. Inner BFD packet identifiers include inner destination internet protocol address (IP), inner user datagram protocol (UDP) destination port address and inner IP time to live (TTL). For example, as illustrated in FIG. 6, after determining whether the received BFD packet includes either MAC address of primary network switch 510 or secondary switch 512, primary network switch 510 removes the outerVxLAN packet header. As such, primary network switch 510 can identify a corresponding ACL entry based on at least one of the inner BFD packet identifiers.

If the BFD packet does not match the ACL entry, primary network switch 510 can restrict the BFD packet from further processing. Additionally, in other embodiments, primary network switch 510 can generate a notification to the network operator to notify the network operator that such a BFD packet may be a malicious attack.

Once a copy of the BFD packet is generated, primary network switch 510 transmits the original BFD packet to secondary network switch 512. In some embodiments, as illustrated in FIG. 6, primary network switch 510 transmits the original BFD packet through interlink 522. As such primary network switch 510 and secondary network switch 512 both retain a copy of the BFD packet and are synchronized in real-time.

In other circumstances, remote VTEP 502 establishes a BFD session with network switch 512. In such circumstances, network switch 512 is the primary vPC node and network switch 510 is the secondary vPC node. Using the above-described principles, network switch 512 receives the BFD packet, processes the BFD packet, generates a copy of the BFD packet and transmits the BFD packet. The result is the same—both synchronization of network switch 510 and 512.

Figure 7:
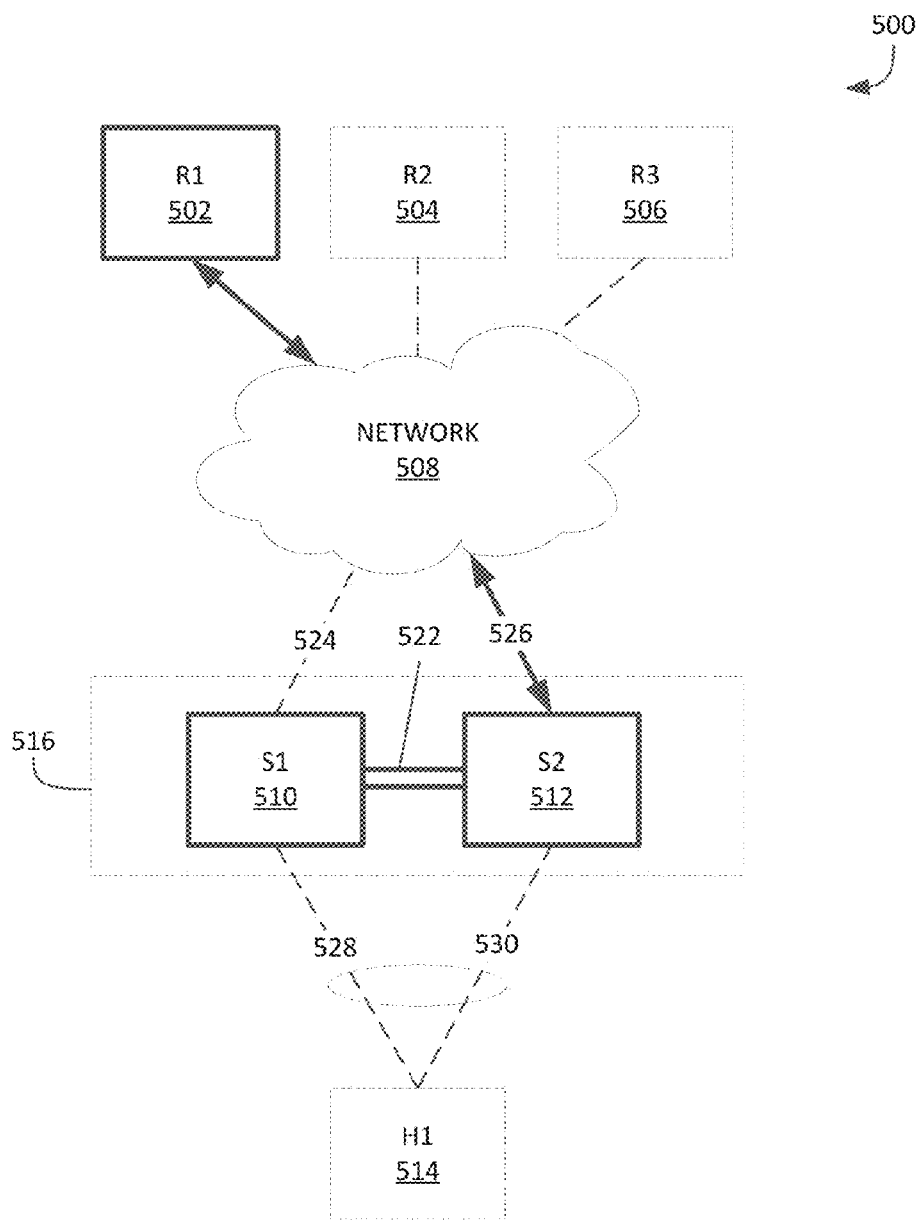
FIG. 7 illustrates another example synchronization pathway of a BFD packet in example system 500.

FIG. 7 illustrates another example synchronization pathway of a BFD packet in example system 500. As illustrated, and using the above-described principles, the example pathway of the BFD packet travels from remote VTEP 502, via network 508 to network switch 512 of dual-homed VTEP 516. Additionally network switches 510 and 512 include the MAC addresses of both network switches 510 and 512.

In some embodiments, remote VTEP 502 establishes a BFD session with network switch 512. As such network switch 512 is the primary vPC node and network switch 510 is the secondary vPC node. Therefore, as illustrated in FIG. 7, when primary network switch 512 receives the BFD packet, primary network switch 512 processes the BFD packet.

While processing the BFD packet, the primary network switch 512 determines whether the BFD packet includes the MAC addresses of either primary network switch 510 or secondary network switch 512. In some embodiments, if primary network switch 512 determines that the BFD packet does not include the MAC addresses of primary network switch 510 or secondary network switch 512, the BFD packet is restricted from further processing by primary network switch 512. Additionally, in other embodiments, the primary network switch 510 can generate a notification to the network operator to notify the network operator that such a BFD packet may be a malicious attack.

Upon determining the BFD packet includes the MAC address either of primary or secondary network switches 510 and 512, primary network switch 512 determines whether there is a corresponding matching ACL entry. The ACL entry can include instructions for the receiving vPC node to generate a copy of the received BFD packet. In some embodiments each vPC node of the dual-homed VTEP can store ACL(s). In other embodiments each vPC node of the dual-homed VTEP can request and receive ACL(s) from a separate database.

In some embodiments, after determining whether the BFD packet includes the MAC address of either of primary vPC node or secondary vPC node, the outer VxLAN packet header is removed by the receiving vPC node. The BFD packet header can include the MAC addresses of primary vPC node or secondary vPC node. As such the ACL entry can then include at least one inner BFD packet identifier. Inner BFD packet identifiers include inner destination internet protocol address (IP), inner user datagram protocol (UDP) destination port address and inner IP time to live (TTL). For example, as illustrated in FIG. 7, after determining whether the received BFD packet includes the MAC address either of primary network switch 512 or secondary switch 510, primary network switch 512 removes the outer VxLAN packet header. As such, primary network switch 512 can identify a corresponding ACL entry based on at least one of the inner BFD packet identifiers.

If the BFD packet does not match the ACL entry, primary network switch 512 can restrict the BFD packet from further processing. Additionally, in other embodiments, primary network switch 512 can generate a notification to the network operator to notify the network operator that such a BFD packet may be a malicious attack.

Once a copy of the BFD packet is generated, primary network switch 512 transmits the original BFD packet to secondary network switch 510. In some embodiments, as illustrated in FIG. 7, primary network switch 512 transmits the original BFD packet through interlink 522. As such primary network switch 512 and secondary network switch 510 both retain a copy of the BFD packet and are synchronized in real-time.

In other circumstances, remote VTEP 502 establishes a BFD session with network switch 510. In such circumstances, network switch 510 is the primary vPC node and network switch 512 is the secondary vPC node. Using the above-described principles network switch 510 receives the BFD packet, processes the BFD packet, generates a copy of the BFD packet and transmits the BFD packet. The result is the same—both synchronization of network switch 510 and 512.

When failover occurs with the primary vPC node, a synchronized secondary vPC node can replace the primary vPC node in a BFD session with a remote VTEP. In some embodiments the secondary vPC node can detect the failover of the primary vPC node before instructing the remote VTEP to switch the BFD session over to the secondary vPC node. In other embodiments, the primary vPC node can detect its own failover and instruct the secondary vPC node to take over the BFD session with the remote VTEP. For example when failover occurs with primary network switch 510, primary network switch 510 can instruct network switch 512 to initialize communications with the remote VTEP for the purposes of taking over the BFD session.

Figure 8:
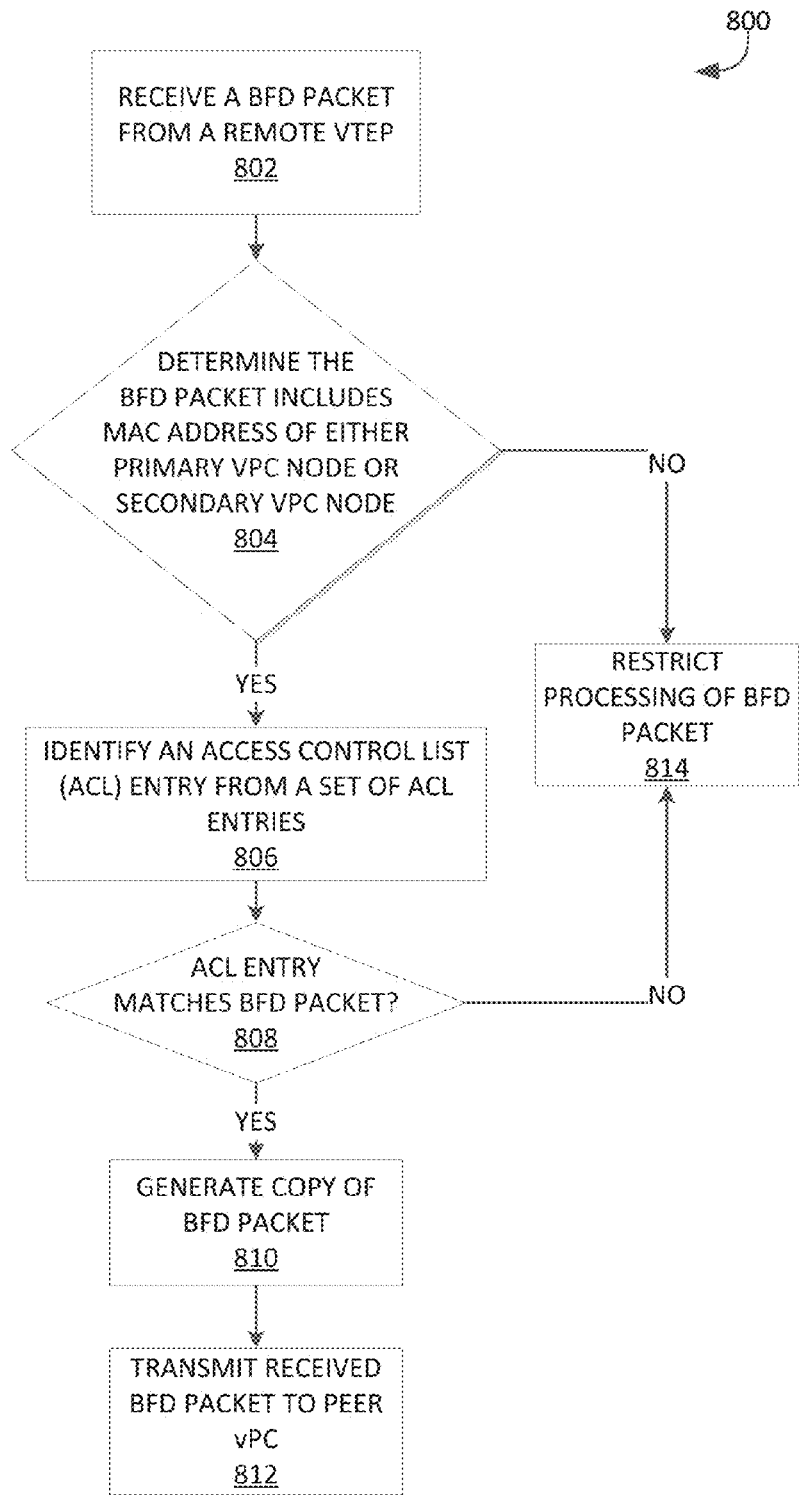
FIG. 8 illustrates an example method for synchronizing a secondary vPC with the primary vPC in a BFD session with a remote VTEP.

Reference is now made to FIG. 8. FIG. 8 illustrates an example method for synchronizing a secondary vPC node with the primary vPC node in a BFD session with a remote VTEP.

At step 802 of example method 800, a vPC node receives a BFD packet from a remote VTEP. For example as illustrated in FIG. 5, remote VTEP 502 views dual-homed VTEP 516 as one logical entity. As such when remote VTEP 502 establishes a BFD session with dual-homed VTEP 516, either network switch 510 or network switch 512 can be the primary vPC node. As such, the other network switch can then be configured to be the secondary vPC node and host the hot standby BFD session.

At step 804, the vPC node determines whether the received BFD packet includes the MAC address of either the primary vPC node or the secondary vPC node. For example, as illustrated in FIG. 6, the receiving network switch 510 can determine whether the received BFD packet includes either the MAC address of network switch 510 or network switch 512.

If the vPC node determines that the received BFD packet does not include the MAC address of either the primary or the secondary vPC node, the receiving vPC node can restrict further processing of the received BFD packet (step 814 of example method 800). For example, as illustrated in FIG. 6, if the receiving network switch 510 determines that the received BFD packet does not include the MAC address of either network switch 510 or network switch 512, then receiving network switch 510 can restrict the received BFD packet from further processing.

If the vPC node determines that the received BFD packet does include the MAC address either of primary vPC node or secondary vPC node, then at step 806 and 808, the vPC node identifies an ACL entry from a set of ACL entries that matches the identifiers of received BFD packet. For example, as illustrated in FIG. 6, receiving network switch 510 can identify and match a corresponding ACL entry from a set of ACL entries based on the identifiers of the received BFD packet. In some embodiments the receiving vPC node identifies a corresponding ACL entry by at least one inner BFD packet identifier because during processing, the receiving vPC node removes the outer VXLAN packet header before identifying a corresponding ACL entry.

If the vPC node cannot identify or match the received BFD packet to an ACL entry from a set of ACL entries, then the vPC node can restrict further processing of the received BFD packet (step 814 of example method 800). For example, as illustrated in FIG. 6, if receiving network switch 510 cannot identify or match the received BFD packet to an ACL entry from a set of ACL entries, then receiving network switch 510 can restrict further processing of the received BFD packet.

If the vPC node identifies an ACL entry that matches the received BFD packet, then at step 812, the vPC node generates a copy of the BFD packet. For example, as illustrated in FIG. 6, if receiving network switch 510 identifies and matches the received BFD packet to an ACL entry from a set of ACL entries, then receiving network switch 510 can generate a copy of the received BFD packet.

Once a copy of the received BFD packet is generated by the vPC node, then the vPC node can transmit the received BFD packet to a peer vPC node. For example, as illustrated by FIG. 6, receiving network switch 510 can transmit the received BFD packet to network switch 512 (the peer vPC node). In some embodiments, as illustrated in FIG. 6, receiving network switch 510 transmits the received BFD packet to network switch 512 through interlink 522.

In some embodiments, to enhance security measures, prior to the receipt of the receipt of the BFD packet from the vPC node, the peer vPC node can verify that vPC node generated a copy of the received BFD packet. If the peer vPC node determines that vPC node generated a copy of the received BFD packet, then the peer vPC node can authorize receipt of the received BFD packet from the vPC node. However, if the peer vPC node determines that vPC node did not generate a copy of the received BFD packet, then the peer vPC node can restrict receipt of the received BFD packet from the vPC node. For example, as illustrated by FIG. 6, network switch 512 can verify whether receiving network switch 510 generated a copy of the received BFD packet from remote VTEP 502. If network switch 512 determines that receiving network switch 510 generated a copy of the received BFD packet, then network switch 512 can authorize receipt of the received BFD packet from receiving network switch 510. Otherwise, receiving network switch 512 can restrict receipt of the received BFD packet from receiving network switch 510.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:
   receiving, by a primary virtual port channel (vPC) node, a packet from a remote node;
   determining, by the primary vPC node, the packet includes a media access control (MAC) address corresponding to either the primary vPC node or a secondary vPC node and at least one inner packet identifier;
   identifying, by the primary vPC node, an access control list (ACL) entry from a set of access control list entries based on the at least one inner packet identifier;
   based on an identified access control list (ACL) entry, generating, by the primary vPC node, a copy of the packet; and
   based on the determined MAC address and after generating a copy of the packet, transmitting, by the primary vPC node to the secondary vPC node, the packet;
   receiving, by the primary vPC node, a second packet;
   authorizing, by the primary vPC node in response to determining the secondary vPC node generated a copy of the second packet, receipt of the second packet;
   restricting by the primary vPC node in response to determining the secondary vPC node did not generate a copy of the second packet, receipt of the second packet.

2. The method of claim 1, further comprising:
   determining, by the secondary vPC node, the primary vPC node generated a copy of the packet.

3. The method of claim 1, wherein the primary vPC node and the secondary vPC node include MAC addresses of both the primary vPC node and the secondary vPC node.

4. The method of claim 1, further comprising:
   receiving, by the primary vPC node and from a second remote node, a second packet;
   determining, by the primary vPC node, the second packet includes the MAC address corresponding to either the primary vPC node or the secondary vPC node and an inner user datagram protocol (UDP) destination address;
   identifying, by the primary vPC node, the ACL entry from a set of ACL entries based on the inner UDP destination address, the access control list entry including an instruction to copy the second packet;
   based on the identified ACL entry, generating, by the primary vPC node, a copy of the second packet; and
   based on the determined MAC address and after generating a copy of the second packet, transmitting, by the primary vPC node to the secondary vPC node, the packet.

5. The method of claim 1, wherein the inner packet identifier includes at least one of an inner destination internet protocol (IP) address, an inner user datagram protocol (UDP) destination port address and an inner IP time to live (TTL).

6. A non-transitory computer-readable medium containing instructions that, when executed by a primary vPC node, cause the primary vPC node to:
   receive a packet from a remote node;
   determine the packet includes a media access control (MAC) address corresponding to either the primary vPC node or a secondary vPC node, and at least one inner packet identifier;
   identify an access control list (ACL) entry from a set of access control list entries based on the at least one inner packet identifier, the access control list entry including an instruction to copy the packet;
   based on the identified access control list (ACL), generate a copy of the packet; and based on the determined MAC address and after generating a copy of the packet transmit the packet to the secondary vPC node;
   receive, by the primary vPC node, a second packet;
   authorize, by the primary vPC node in response to determining the secondary vPC node generated a copy of the second packet, receipt of the second packet;
   restrict by the primary vPC node in response to determining the secondary vPC node did not generate a copy of the second packet, receipt of the second packet.

7. The non-transitory computer readable medium of claim 6, wherein the instructions further cause the primary vPC node to:
   determine a failover of the primary vPC node; and
   transmit instructions to the node to initialize communications between the node and the secondary vPC node.

8. The non-transitory computer readable medium of claim 7, wherein the inner packet identifier includes at least one an inner destination internet protocol (IP) address, an inner user datagram protocol (UDP) destination port address and an inner IP time to live (TTL).

9. A computing system comprising: a remote node;
a dual-homed virtual tunnel endpoint (VTEP), the dual-homed VTEP including a primary network switch and a secondary network switch;
a processor; and memory containing instructions that, when executed by the processor, cause the secondary network switch to:
receive a packet from the remote node;
determine the packet includes a media access control (MAC) address corresponding to either the primary network switch or the secondary network switch and at least one inner packet identifier;
identify an access control list (ACL) entry from a set of access control list entries based on the at least one inner packet identifier, the access control list entry including an instruction to copy the packet;
based on the identified ACL entry, generate a copy of the packet; and
based on the determined MAC address and after generating a copy of the packet, transmit the packet to the primary network switch;
receive, by the primary vPC node, a second packet;
authorize, by the primary vPC node in response to determining the secondary vPC node generated a copy of the second packet, receipt of the second packet;
restrict by the primary vPC node in response to determining the secondary vPC node did not generate a copy of the second packet, receipt of the second packet.

10. The computing system of claim 9, wherein the instructions further cause the secondary network switch to:
receive from the primary network switch or the node, a copy of an initial packet, the initial packet including a discriminator;
determine the discriminator is associated with a bidirectional forwarding detection (BFD) protocol between the secondary network switch and the node; and
configure the secondary network switch to be a hot-standby.

11. The computing system of claim 10, wherein the instructions further cause the secondary network switch to:
determine a failover of the primary network switch; and
transmit instructions to the node to initialize communications between the node and the secondary network switch.

12. The computing system of claim 9, wherein primary network switch and the secondary network switch both include MAC addresses of the primary network switch and the secondary network.

13. The computing system of claim 9, wherein the inner packet identifier includes at least one of an inner destination internet protocol (IP) address, an inner user datagram protocol (UDP) destination port address and an inner IP time to live (TTL).

14. The computing system of claim 9, wherein the remote node and the dual-homed VTEP have initialized a BFD session over VxLAN.

* * * * *